(12) United States Patent
Koizumi et al.

(10) Patent No.: US 7,948,541 B2
(45) Date of Patent: May 24, 2011

(54) SIGNAL READING APPARATUS AND IMAGE PICKUP SYSTEM USING THE SIGNAL READING APPARATUS

(75) Inventors: Toru Koizumi, Yokohama (JP); Hideaki Takada, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 501 days.

(21) Appl. No.: 11/850,287

(22) Filed: Sep. 5, 2007

(65) Prior Publication Data

US 2008/0062294 A1 Mar. 13, 2008

(30) Foreign Application Priority Data

Sep. 7, 2006 (JP) .................................. 2006-242932

(51) Int. Cl.
*H04N 3/14* (2006.01)
*H04N 5/335* (2011.01)
(52) U.S. Cl. ........................................................ 348/300
(58) Field of Classification Search .................. 348/305, 348/321, 322, 323, 324, 315, 316, 283, 300
See application file for complete search history.

(56) References Cited

U.S. PATENT DOCUMENTS

| | | | |
|---|---|---|---|
| 4,835,404 A | 5/1989 | Sugawa et al. | |
| 4,996,413 A | 2/1991 | McDaniel et al. | |
| 5,631,704 A | 5/1997 | Dickinson et al. | |
| 5,698,892 A | 12/1997 | Koizumi et al. | 257/620 |
| 6,188,094 B1 | 2/2001 | Kochi et al. | 257/232 |
| 6,646,249 B2 | 11/2003 | Bird | |
| 6,670,990 B1 | 12/2003 | Kochi et al. | 348/310 |
| 6,741,283 B1 | 5/2004 | Merrill et al. | |
| 6,784,928 B1 * | 8/2004 | Sakurai et al. | 348/220.1 |
| 6,803,952 B1 | 10/2004 | Watanabe | |
| 6,847,026 B2 | 1/2005 | Koizumi et al. | |
| 6,960,751 B2 | 11/2005 | Hiyama et al. | 250/208.1 |
| 6,987,685 B2 | 1/2006 | Koizumi et al. | |
| 7,016,089 B2 | 3/2006 | Yoneda et al. | 358/482 |
| 7,110,030 B1 | 9/2006 | Kochi et al. | 348/308 |
| 7,126,838 B2 | 10/2006 | Koizumi et al. | |
| 7,187,052 B2 | 3/2007 | Okita et al. | 257/444 |
| 7,199,827 B2 | 4/2007 | Inokuma et al. | |
| 7,227,208 B2 | 6/2007 | Ogura et al. | 257/292 |
| 7,283,305 B2 | 10/2007 | Okita et al. | 359/619 |
| 7,321,110 B2 | 1/2008 | Okita et al. | 250/208.1 |

(Continued)

FOREIGN PATENT DOCUMENTS

JP 2589297 B2 12/1996

(Continued)

*Primary Examiner* — Sinh Tran
*Assistant Examiner* — Jason A Flohre
(74) *Attorney, Agent, or Firm* — Fitzpatrick, Cella, Harper & Scinto (57) ABSTRACT

A signal reading apparatus includes first and second common signal lines from which a signal from a signal generation unit is output and first and second amplifier circuits and a switch configured to control a conductive state of the first and the second common signal lines. The signal reading apparatus includes a first signal reading method of reading a signal from the first common signal line after being amplified in the first amplifier circuit and reading a signal from the second common signal line after being amplified in the second amplifier circuit and a second signal reading method of turning ON the switch to read the signal from the first common signal line and the signal from the second common signal line individually after being amplified in the first amplifier circuit. The signal reading apparatus includes a control unit for controlling between the first and second signal reading methods.

20 Claims, 9 Drawing Sheets

U.S. PATENT DOCUMENTS

| | | | |
|---|---|---|---|
| 7,324,144 B1 | 1/2008 | Koizumi | 348/294 |
| 2003/0107659 A1* | 6/2003 | Takahashi et al. | 348/222.1 |
| 2003/0164887 A1 | 9/2003 | Koizumi et al. | 348/308 |
| 2004/0085467 A1* | 5/2004 | Inokuma et al. | 348/301 |
| 2005/0052940 A1 | 3/2005 | Koizumi et al. | |
| 2005/0168618 A1 | 8/2005 | Okita et al. | 348/335 |
| 2005/0174552 A1 | 8/2005 | Takada et al. | 355/53 |
| 2005/0179796 A1 | 8/2005 | Okita et al. | 348/308 |
| 2005/0269604 A1 | 12/2005 | Koizumi et al. | 257/291 |
| 2006/0043439 A1 | 3/2006 | Koizumi | 257/291 |
| 2006/0056221 A1 | 3/2006 | Koizumi et al. | |
| 2006/0157759 A1 | 7/2006 | Okita et al. | 257/292 |
| 2006/0158539 A1 | 7/2006 | Koizumi et al. | 348/300 |
| 2006/0158543 A1 | 7/2006 | Ueno et al. | 348/308 |
| 2006/0208291 A1 | 9/2006 | Koizumi et al. | 257/292 |
| 2006/0208292 A1 | 9/2006 | Itano et al. | 257/292 |
| 2006/0221667 A1 | 10/2006 | Ogura et al. | 365/149 |
| 2008/0036891 A1 | 2/2008 | Ono et al. | 348/308 |
| 2008/0062295 A1 | 3/2008 | Fujimura et al. | 348/301 |
| 2008/0062296 A1 | 3/2008 | Ogura et al. | 348/308 |

FOREIGN PATENT DOCUMENTS

| | | |
|---|---|---|
| JP | 2741703 B2 | 1/1998 |
| JP | 2000-287130 A | 10/2000 |
| JP | 2003-224776 A | 8/2003 |
| JP | 2004-153705 A | 5/2004 |
| JP | 2005-20483 A | 1/2005 |
| JP | 2005-86260 A | 3/2005 |

* cited by examiner

SIGNAL READING APPARATUS AND IMAGE PICKUP SYSTEM USING THE SIGNAL READING APPARATUS

BACKGROUND OF THE INVENTION

1. Field of the Invention

The present invention relates to a signal reading apparatus and an image pickup system using the signal reading apparatus.

2. Description of the Related Art

Examples of a signal detection apparatus for detecting a magnetic signal or the like include a photoelectric conversion apparatus for detecting a light. Representative types of this photoelectric conversion apparatus are a CCD type photoelectric conversion apparatus and a MOS type photoelectric conversion apparatus. The MOS type photoelectric conversion apparatus is provided with a pixel unit in which pixels that are unit cells each including a photoelectric conversion element such as a photo diode are arranged two-dimensionally, a capacitance unit for holding a signal from the pixel unit, and a common signal line for outputting a signal from the capacitance unit to the outside.

Japanese Patent Laid-Open No. 2005-020483 discloses a configuration where a plurality of common signal lines are provided and multiplexed. In addition, Japanese Patent Laid-Open No. 2005-086260 discloses a configuration where a capacitance unit is formed into a block for reading.

As disclosed in Japanese Patent Laid-Open No. 2005-020483, by providing the plurality of common signal lines, the speed of reading data is improved. However, an offset due to a variation in the common signal lines may be caused. Furthermore, in a case where the plurality of common signal lines are provided, the number of amplifiers provided to output units is also increased. Thus, the power consumption is increased. Also, depending on a relation with respect to the outside of the photoelectric conversion apparatus, the number of output terminals required for the photoelectric conversion apparatus may be limited in some cases.

SUMMARY OF THE INVENTION

In view of the above-described circumstances, the present invention provides a signal reading apparatus in which the number of output terminals can be changed. Furthermore, the present invention provides an image pickup system using the signal reading apparatus.

According to an aspect of the present invention, a signal reading apparatus, includes: a signal generation unit for generating a signal; a plurality of common signal lines at least including a first common signal line and a second common signal line from which the signal from the signal generation unit is output; an amplifier circuit unit at least including a first amplifier circuit amplifying the signal from the first common signal line and a second amplifier circuit amplifying the signal from the common signal lines; a switch configured to control an electrical connection of the first common signal line and the second common signal line; and a control unit configured to control between a first signal reading method of turning OFF the switch to read a signal from the first amplifier circuit and the second amplifier circuit and a second signal reading method of turning ON the switch to read the signals of the first common signal line and the second common signal line individually from the first amplifier circuit.

Other features and advantages of the present invention will be apparent from the following description taken in conjunction with the accompanying drawings, in which like reference characters designate the same or similar parts throughout the figures thereof.

The accompanying drawings, which are incorporated in and constitute a part of the specification, illustrate embodiments of the invention and, together with the description, serve to explain the principles of the invention.

DESCRIPTION OF THE EMBODIMENTS

A signal reading apparatus according to embodiments of the present invention includes a signal generation unit, a plurality of common signal lines from which the signal is output, and a drive circuit unit. Furthermore, the signal reading apparatus includes an amplifier circuit unit configured to amplify the signal from the respective common signal lines. This amplifier circuit unit includes a plurality of amplifier circuits arranged corresponding to the respective common signal lines. The respective amplifier circuits are connected to a power supply and supplied with electric power. Then, at least two common signal lines are connected to each other via a switch. The signal reading apparatus also includes a signal reading method of amplifying and reading signals of the corresponding common signal lines from the plurality of amplifier circuits. Furthermore, the signal reading apparatus includes a signal reading method of amplifying and reading signals of a common signal line connected from an amplifier circuit corresponding to one common signal line among the common signal lines connected via a switch. Additionally, the signal reading apparatus includes a control unit capable of performing a control between the two signal reading methods.

By controlling between these two signal reading methods, it is possible to change the number of output terminals after the amplifier circuit. In addition, it is possible to reduce the electric power consumption.

First Embodiment

According to the present embodiment, a description will be given of an example where a photoelectric conversion apparatus is used as a signal reading circuit. In other words, a description will be given of a case where the signal reading apparatus is provided with the photoelectric conversion apparatus configured to detect a light as the signal generation unit.

Figure 1:
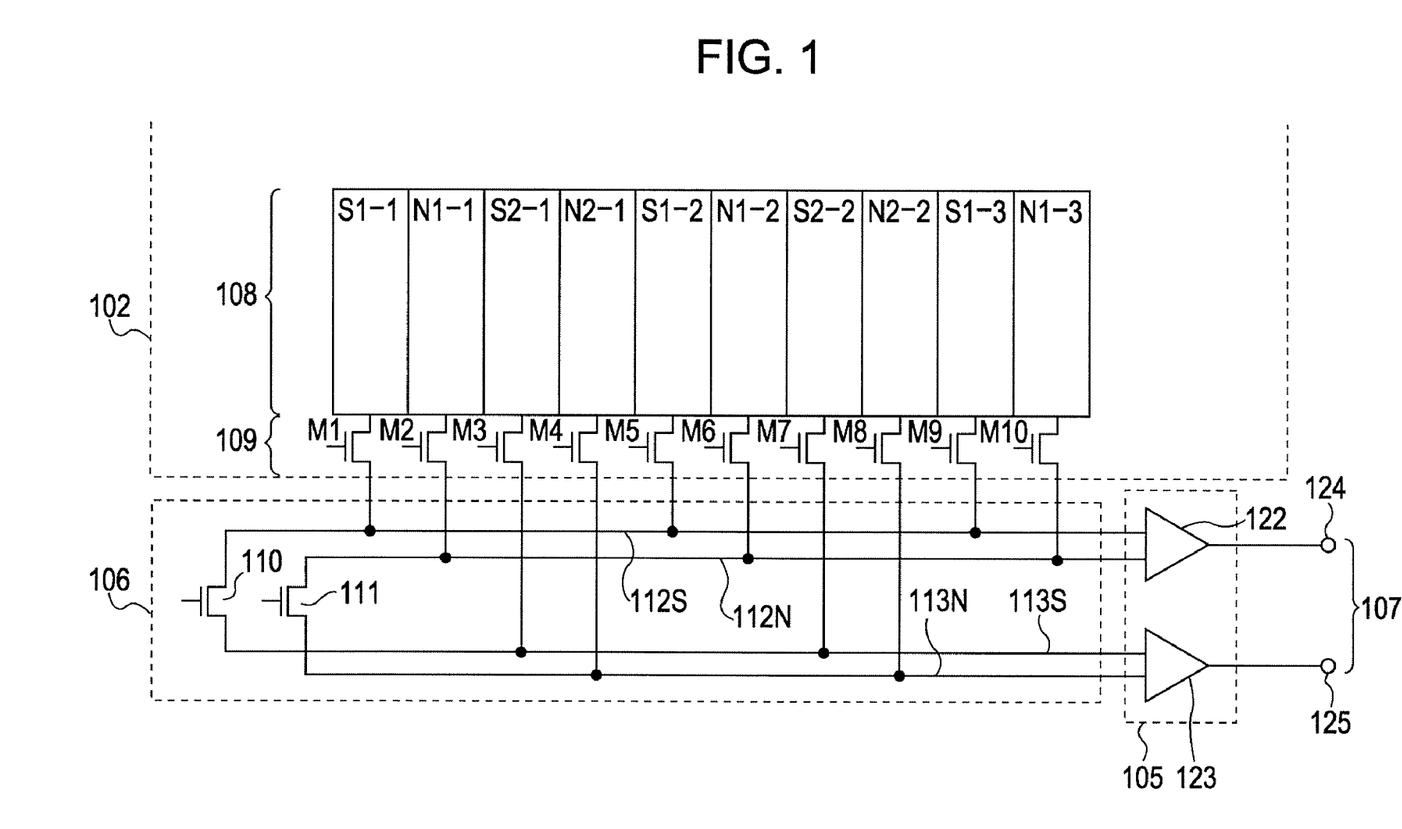
FIG. 1 is a part of a circuit diagram illustrating a signal reading apparatus according to a first embodiment of the present invention.
Figure 2:
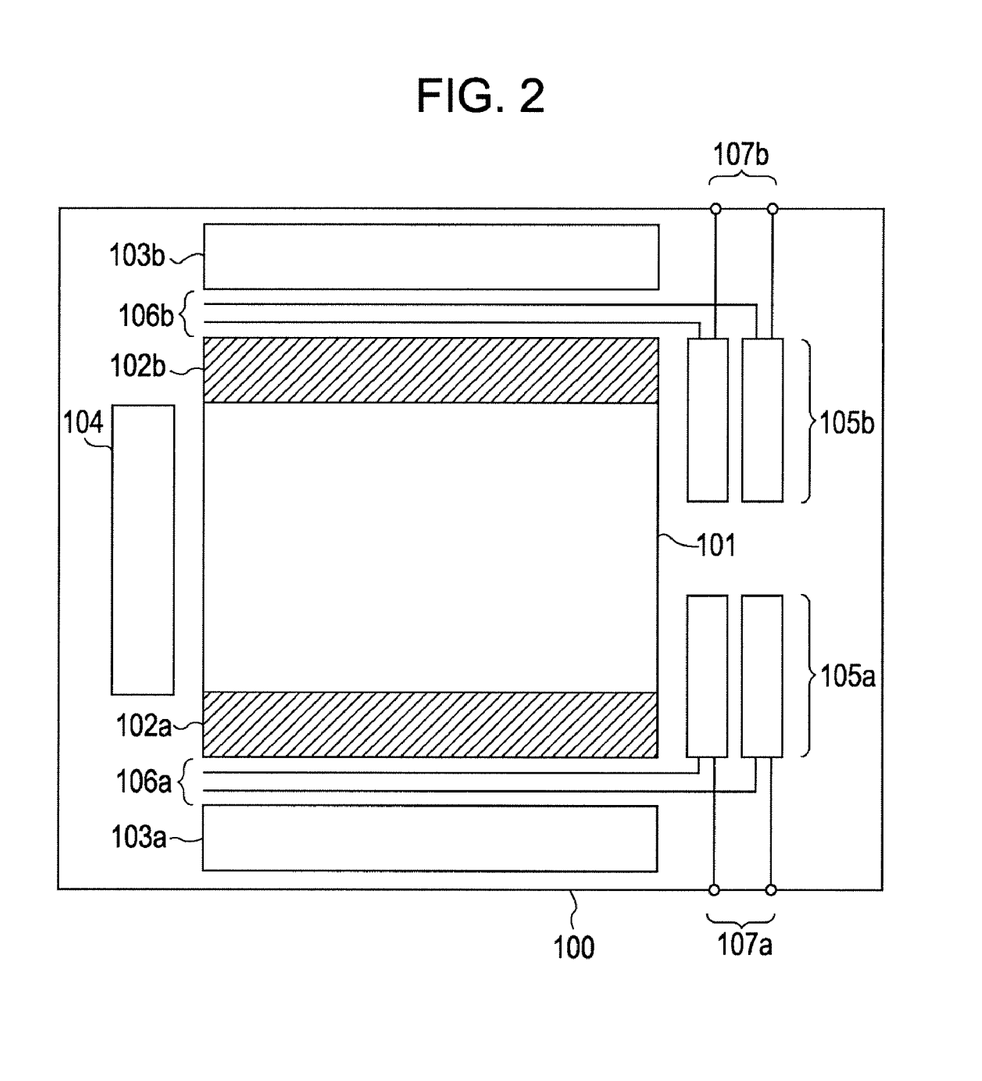
FIG. 2 is a schematic diagram of the signal reading apparatus.

FIG. 1 is a schematic circuit diagram illustrating a part of the signal reading apparatus according to a first embodiment of the present embodiment. FIG. 2 is a schematic diagram illustrating an entire signal reading apparatus including the part illustrated in FIG. 1.

First, an overall configuration will be described. FIG. 2 illustrates a signal generation unit 101. In the signal generation unit 101, a plurality of unit cells (pixels) are arranged. The pixel includes a photoelectric conversion element as a signal generation element. The photoelectric conversion element is composed of, for example, a photo diode. The pixel also includes a transfer transistor configured to transfer a charge that is a signal of the photoelectric conversion element to a signal holding unit (a charge holding unit) and a reset transistor configured to reset a potential of the charge holding unit to a reference potential. Herein, the charge holding unit is an active region. Furthermore, the pixel includes an amplifier transistor which constitutes a part of a source follower circuit and is configured to output a signal based on the potential of the charge holding unit. Then, a reset signal (a noise signal) based on the potential of the charge holding unit set to the reference potential by the reset transistor and an optical signal based on the charge which is transferred from the photoelectric conversion element are output from the pixel. The optical signal and the reset signal will be described in detail later.

A capacitance unit 102 includes a switch configured to output the signal to a line memory and a common signal line. The capacitance unit 102 is used for both holding a signal and reading the signal and hereinafter is referred to as reading unit. The reading unit 102 may be provided with a signal amplifier unit such as an amplifier and an A/D converter. Reference numeral 103 denotes a drive circuit unit provided with a horizontal scanning circuit. Signs a and b in reference symbols are used for simplicity in the description and means the same configuration. Furthermore, reference numeral 104 denotes a drive circuit unit provided with a vertical scanning circuit, reference numeral 105 denotes a drive circuit unit, and reference numeral 107 denotes an output terminal unit. Reference numeral 106 denotes a common signal line unit. According to the present embodiment, signals from the signal generation unit 101 are arbitrarily sorted and read by the reading unit 102a and the reading unit 102b. Then, in the common signal line unit 106a, two sets of common signal lines are arranged. The set of the common signal lines refers to a common signal line for outputting a signal for forming an image and a common signal line for outputting a signal functioning as a reference, that is, a reset signal. Therefore, in the reading units 102a and 102b, four common signal lines are arranged.

While referring to FIG. 1, a detailed configuration will be described. FIG. 1 illustrates the reading unit 102a, the common signal line unit 106a, the drive circuit unit 105a, and the output terminal unit 107a in FIG. 2. The symbol a is omitted. In FIG. 1, the drive circuit unit 105 includes amplifier circuits 122 and 123, and the output terminal unit 107 includes output terminals 124 and 125. The reading unit 102 includes a line memory 108 for holding the signal read from the signal generation unit 101, and a switch unit 109 for outputting the signal held in the line memory 108 to the common signal line unit 106. The common signal line unit 106 includes a first common signal line 112S, a second common signal line 113S, a third common signal line 112N, and a fourth common signal line 113N. The first common signal line 112S and the third common signal line 112N form a first set, and the second common signal line 113S and the fourth common signal line 113N form a second set. Signs S1 and N1 of the line memories indicate that the signal is output to the first set of the common signal line 112S and the common signal line 112N. Then, Signs S2 and N2 of the line memories indicate the signal is output to the second set of the common signal line 113S and the common signal line 113N.

In addition, symbols N1 and N2 of the line memories indicate that a reference signal is held. The reference signal is also called noise signal and is composed of the reset signal output from the signal generation unit 101, the reference signal (also known as offset) in a case where the reading unit 102 includes an amplifier, etc., or the like. Signs S1 and S2 of the line memories indicate line memories for storing an optical signal. The optical signal refers to a signal in which the above-described reference signal and a signal generated by the light are superimposed on one another. The memories having the symbols S1, S2, N1, and N2 may be referred to as a line memory group. These line memories are regularly arranged as illustrated in FIG. 1.

Figure 3A:
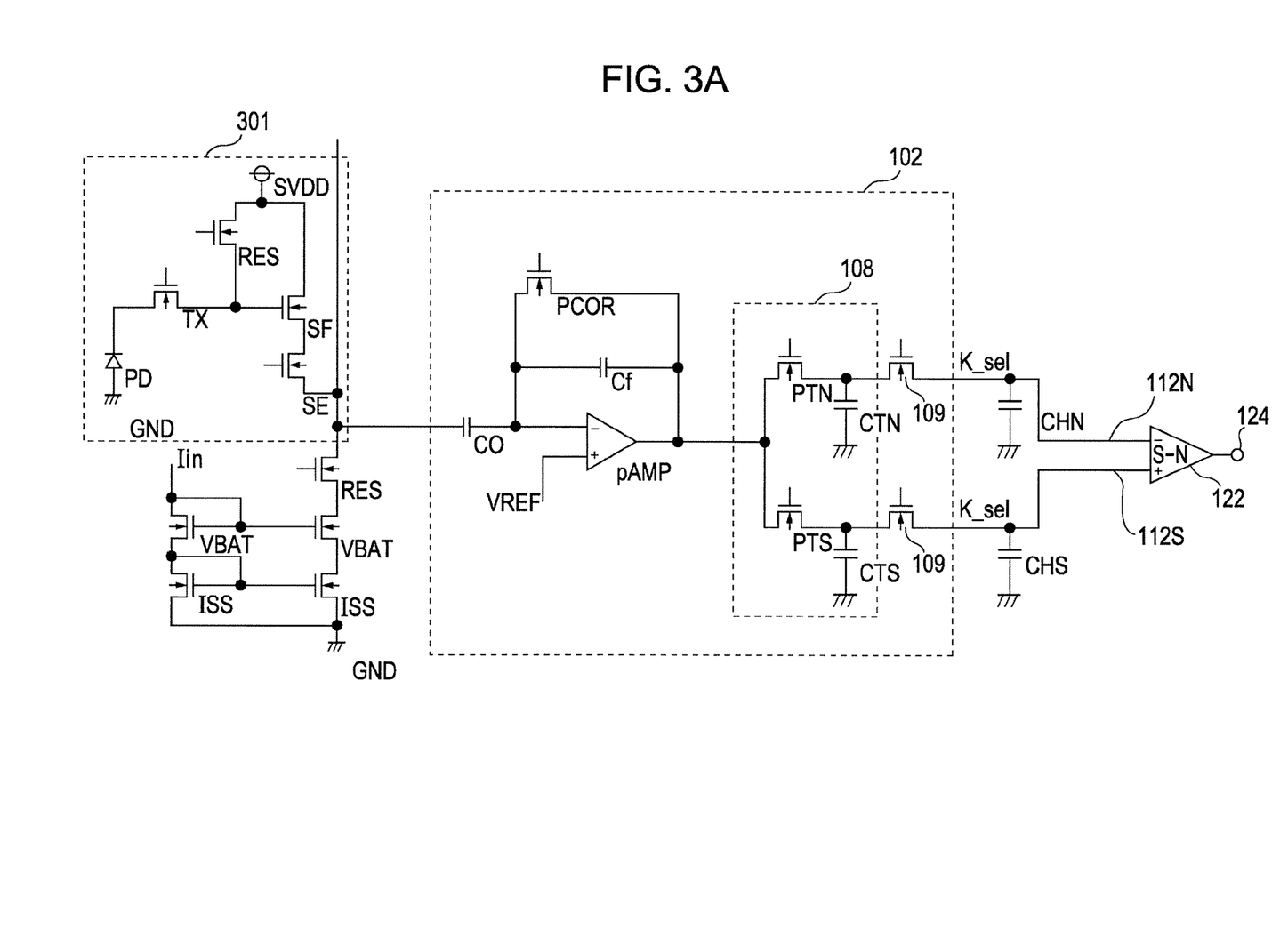
FIG. 3A illustrates an equivalent circuit of a reading unit according to the first embodiment.

Now, with reference to FIG. 3A, an equivalent circuit of a configuration including the line memories will be briefly described. FIG. 3A illustrates a pixel 301 surrounded by a dotted line, the reading unit 102 surrounded by a dotted line, the common signal line 112S and 112N, the amplifier circuit 122, and the output terminal 124. The signal generation unit 101 of FIG. 1 is composed by arranging, for example, a plurality of pixels 301. The pixel 301 includes a photo diode PD, a transfer transistor Tx, and a reset transistor RES. The reset transistor RES is supplied with a power supply SVDD that is a reference voltage. Furthermore, the pixel 301 includes an amplifier transistor and a selection transistor which are a part of a source follower circuit. A signal is read from the above-described pixel 301 to the reading unit 102. In the reading unit 102 of FIG. 3A, the signal is input from a clamp capacitor C0 to the amplifier to be held in the line memory 108. Then, the signal is read in the common signal line 112S and 112N by the switch unit 109. Herein, CHS and CHN indicate the capacitance of the common signal line. One memory configuration of the line memory 108 is composed of a switch PTS and a capacitor CTS.

In such a photoelectric conversion apparatus, as illustrated in FIG. 1, a switch 110 (first switch) for connecting the common signal line 112S and 113S to each other and a switch 111 (second switch) for connecting the common signal line 112N and 113N to each other are further arranged. By controlling a conductive state of the switches 110 and 111, it is possible to switch the signal reading methods. One signal reading method is a method of reading four signals of the line memories S1-1, N1-1, S2-1, and N2-1 into the common signal lines 112S, 112N, 113S, and 113N in parallel. Another signal reading method is a method of reading the signals held in the line memories S1-1 and N1-1 into the common signal lines 112S and 112N and thereafter reading the signals held in the line memories S2-1 and N2-1 into the common signal lines 112S and 112N. In other words, the signals output from the line memory groups S1 and N1 and the signals output from the line memory groups S2 and N2 are individually and alternately read out. By switching the signal reading methods in this way, it is possible to change the number of used output terminals easily. In addition, in a case where one output terminal is used, the drive of the amplifier circuit corresponding to an unused output terminal can be stopped, thus making it possible to achieve low power consumption.

Figure 4A:
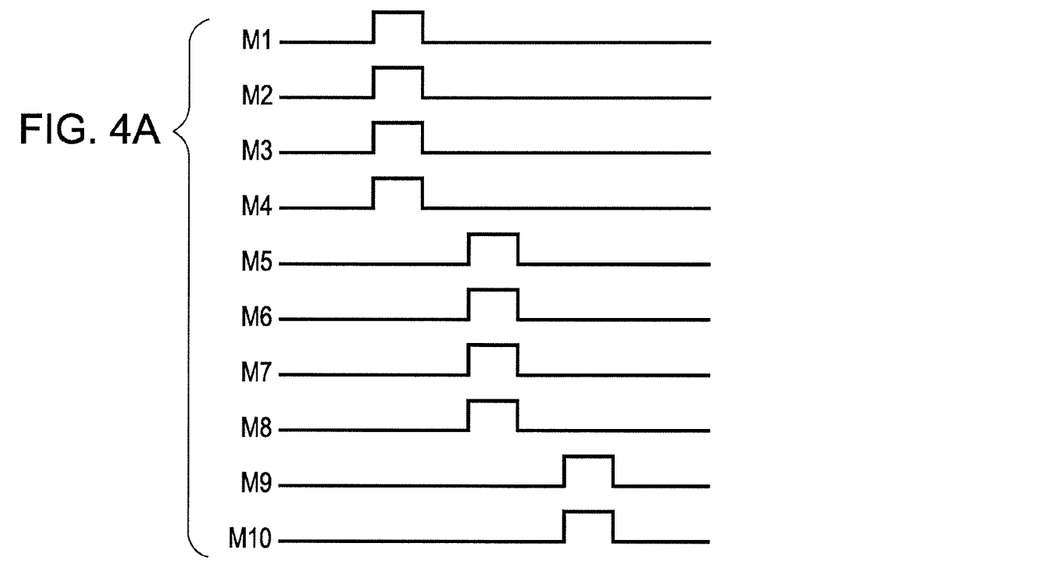
FIG. 4A illustrates a driving method in a first signal reading method.
Figure 4B:
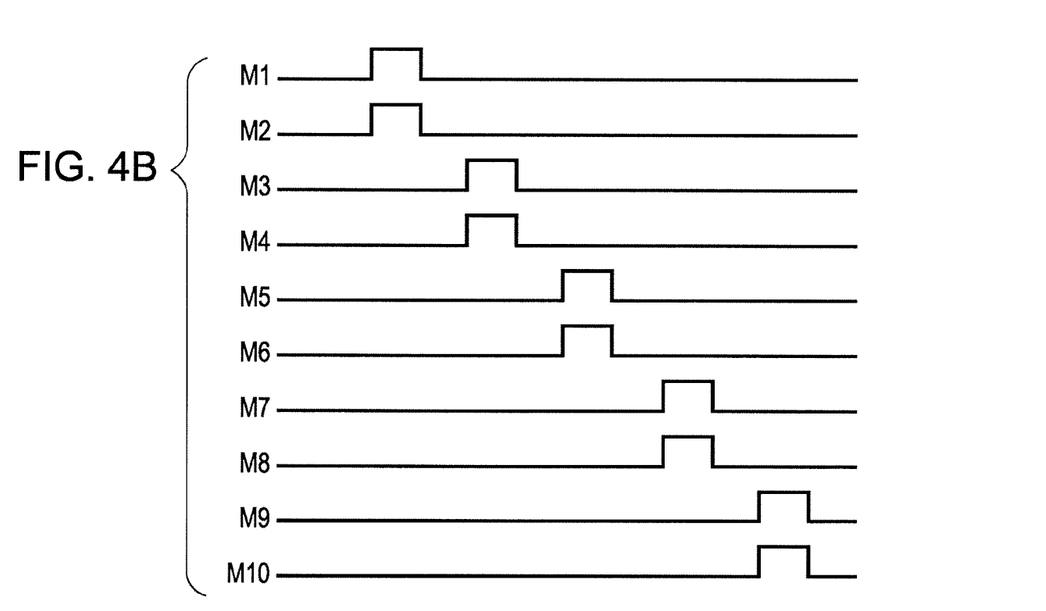
FIG. 4B illustrates a driving method in a second signal reading method.

FIG. 4A and FIG. 4B illustrate the specific drive method. FIG. 4 is a pulse diagram of the switch from M1 to M10 of the switch unit 109 in which the switch is turned ON (conductive) to read the signal from the line memory 108 when the pulse is high. The first signal reading method is a method of reading the four signals held in the line memory groups S1 and N1 and the line memory groups S2 and N2 in parallel. The switches 110 and 111 in FIG. 1 are turned OFF (non-conductive) closing and opening of the switch unit 109 are performed at a timing illustrated in FIG. 4A. At this time, the signals from the common signal lines 112S, 112N, 113S, and 113N are differentially amplified in the amplifier circuits 122 and 123 arranged corresponding to the respective common signal lines. Then, the outputs are output from the two output terminals 124 and 125 in parallel.

According to the second signal reading method, the switches 110 and 111 in FIG. 1 are turned ON and closing and opening of the switch unit 109 are performed at a timing illustrated in FIG. 4B. The operation will be described specifically. First, the signals held in the line memories S1-1 and N1-1 are read into the common signal lines 112S and 112N and output from the first amplifier circuit 122 arranged corresponding to the common signal lines 112S and 112N. After that, the signals held in the line memories S2-1 and N2-1 are read from the second common signal line 113S via the switch 110 into the first common signal line 112S. The signal held in the line memory S2-1 and the signal held in the line memory N2-1 are read at the same time from the fourth common signal line 113N into the third common signal line 112N. Then, the signals are amplified in the first amplifier circuit 122 arranged while corresponding to the first common signal line 112S and the third common signal line 112N and output. In other words, according to this method, it is possible to multiplex the signals for output. In addition, while the second signal reading method is performed, as the signal from the second amplifier circuit 123 is not output, it is possible to keep the second amplifier circuit 123 turned OFF.

Figure 5:
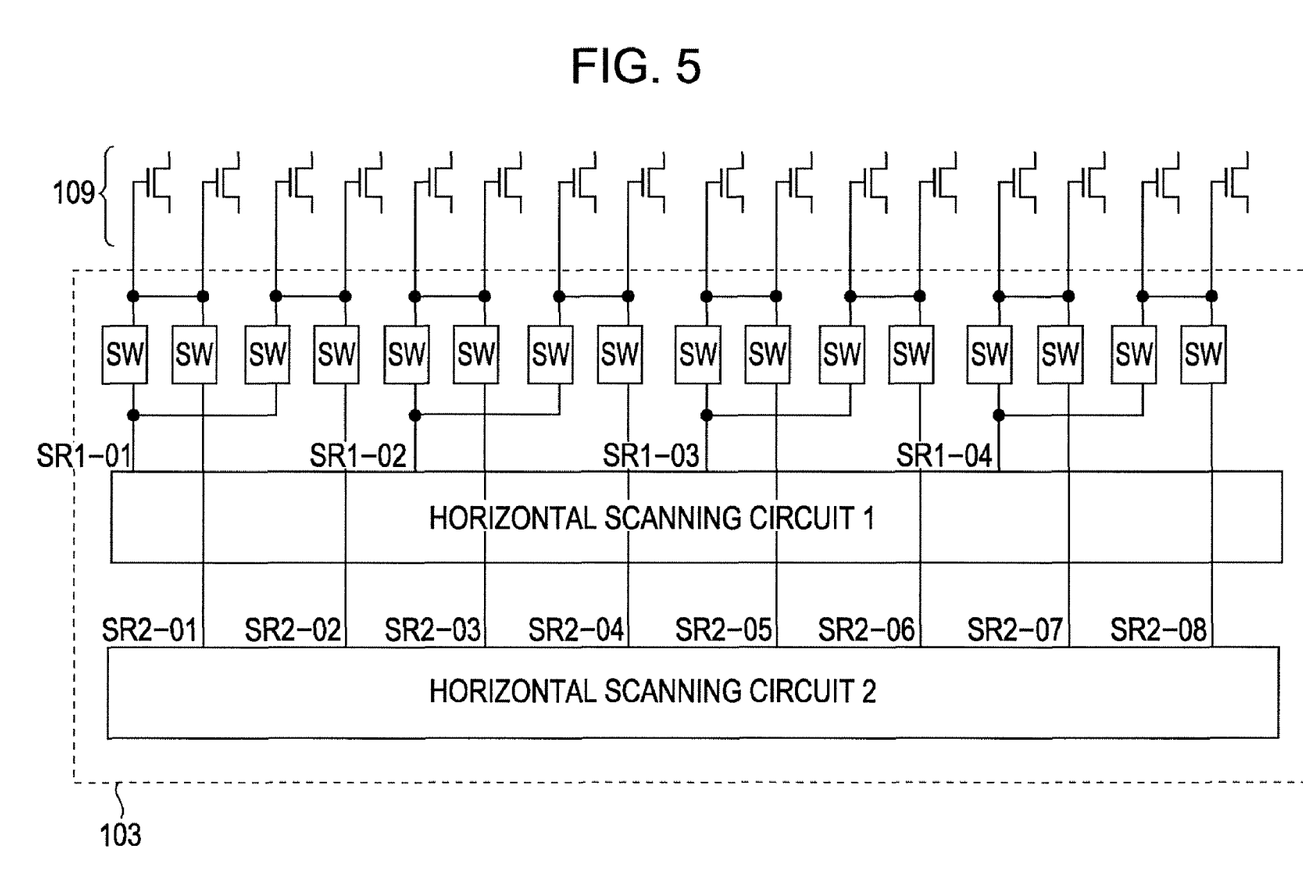
FIG. 5 illustrates an example of a drive circuit unit.

While referring to FIG. 5, a description will be given of an example of the configuration of the drive circuit unit 103 for switching these signal reading methods. The common signal line unit 106 is arranged between the switch unit 109 and the drive circuit unit 103 but this common signal line unit is omitted in FIG. 5. The drive circuit unit 103 according to the present embodiment is composed of two horizontal scanning circuits. Due to an output from a horizontal scanning circuit 1, a pulse of FIG. 4A is supplied to the switch unit 109. Due to an output from a horizontal scanning circuit 2, a pulse of FIG. 4B is supplied to the switch unit 109. According to the first signal reading method, with the output from the respective terminals of the horizontal scanning circuit 1 such as SR1-01 and SR1-02, the switch unit 109 is driven. In contrast, according to the second signal reading method, with the output from the respective terminals of the horizontal scanning circuit 2 such as SR2-01 and SR2-02, the switch unit 109 is driven. The switching between these two types of the drive signals is performed through an arbitrary method. For example, the switching is performed in accordance with a signal for setting the signal reading method (mode) contained in serial communication to be input to the signal reading apparatus from the outside. In accordance with the signal for setting the signal reading mode, a control unit (not shown) is included in the drive circuit unit 103 and is configured to control the turning ON and OFF of the switches 110 and 111 and the switching between the horizontal scanning circuit 1 and the horizontal scanning circuit 2. Furthermore, a conductive state between the amplifier circuit and the power supply, that is, the supply of the electric power to the amplifier circuit, is controlled by the control unit.

Herein, according to the second signal reading method, the multiplexing can be achieved without a distortion of a waveform or an offset on an output signal.

As described above, the two signal reading methods can be easily switched, and therefore it is possible to easily change the number of output terminals. In addition, the number of amplifier circuits to be driven can be reduced, and therefore it is possible to achieve low power consumption. Furthermore, it is possible to provide the photoelectric conversion apparatus in which the low-speed low-power consumption drive and the high speed drive can be arbitrarily switched. Moreover, as the number of output terminals can be varied arbitrarily, it is possible to easily perform the connection to an external apparatus.

According to the present embodiment, the switches 110 and 111 for respectively connecting the common signal lines 112S and 113S and the common signal lines 112N and 113N are each composed of one switch but may be formed by arranging a plurality of switches. With this configuration, it is possible to reduce the shift amount of the waveform in a case where a waveform shift (shading) of the signal occurs depending on the position of the line memory. For example, four of the switches 110 may be provided and arranged at both the ends of the common signal line 112S and 113S and at even intervals therebetween.

Second Embodiment

In a case where the plurality of signal reading methods are switched as in the first embodiment, a gain of a signal to be read through the method may vary in some cases. In view of the above, according to the present embodiment, a method of supplying an appropriate gain will be examined.

A capacitance of the line memory 108 is set as CT and a capacitance of the common signal line is set as CH. CH is composed of a parasitic capacitance of the common signal line and the switch unit 109. The common signal line is reset to a reset voltage Vres before the reading is performed. When the signal held in the line memory 108 is set as a voltage signal Vs, the voltage of the common signal line after the signal is read in response to the turning ON of the switch unit 109 is calculated as follows.

$$(CT \cdot Vs + CH \cdot Vres)/(CT+CH) \quad \text{(Expression 1)}$$

According to the first embodiment, as the drive circuit unit 105 performs a differential process, the following signal is output from the drive circuit unit 105.

$$[(CT \cdot Vs + CH \cdot Vres)/(CT+CH) - (CT \cdot Vn + CH \cdot Vres)/(CT+CH)] \cdot Gamp + Vref = (Vs-Vn) \cdot CT/(CT+CH) \cdot Gamp + Vref \quad \text{(Expression 2)}$$

Wherein, Vs represents the optical signal, and Vn represents the reset signal. Gamp represents the gain of the drive circuit unit 105, and Vref represents the reference output voltage.

In a case where multiplexing is performed by changing the signal reading method, the capacitance of the common signal line becomes doubled, and therefore the output voltage of the drive circuit unit 105 is represented as follows.

$$(Vs-Vn) \cdot CT \cdot Gamp/(CT+2CH) + Vref \quad \text{(Expression 3)}$$

By supplying the appropriate gain Gamp for satisfying each expression in accordance with the signal reading method, it is possible to match the final gains of the reading signals to each other.

Third Embodiment

Figure 6:
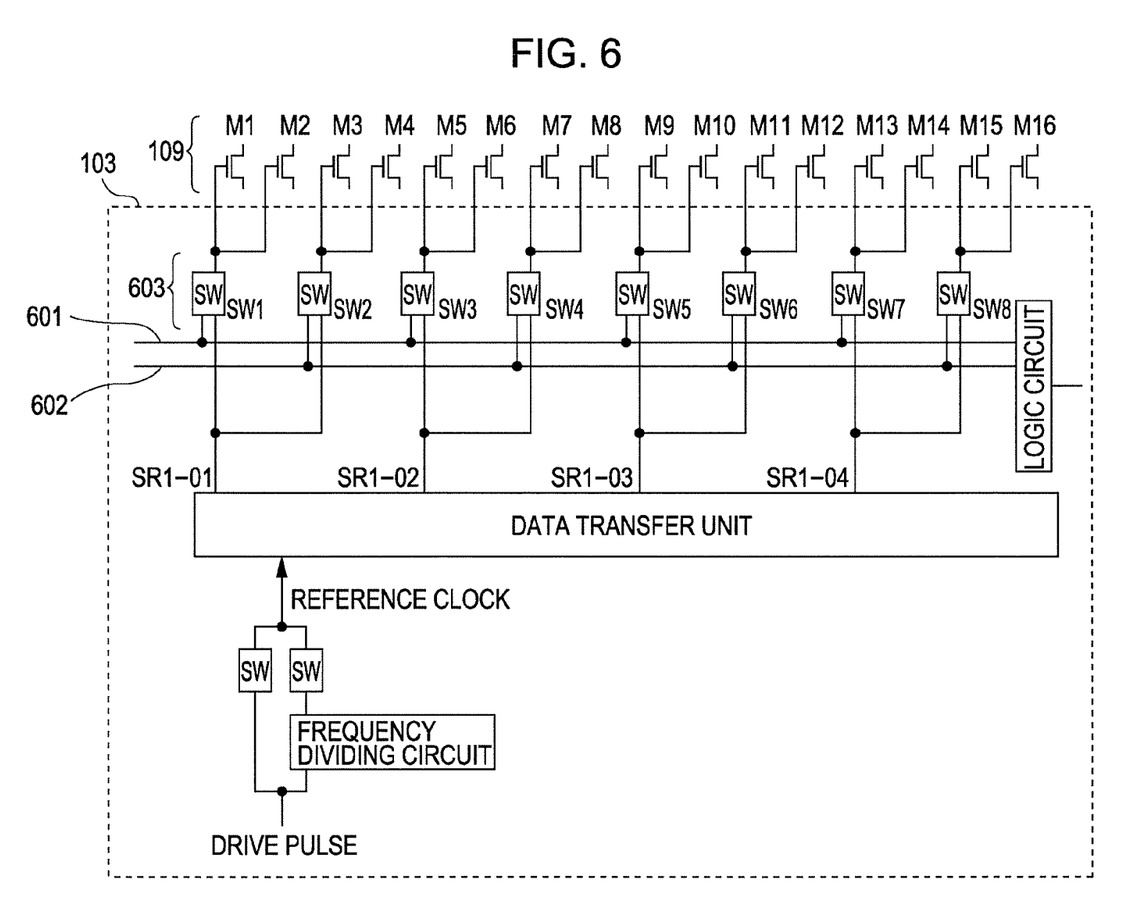
FIG. 6 illustrates another example of a drive circuit unit.

FIG. 6 is a schematic diagram of the drive circuit unit 103 according to the present embodiment. A difference between the present embodiment and the first embodiment resides in the configuration of the drive circuit unit 103, which has been described referring to FIG. 5. In the drive circuit unit 103 according to the present embodiment, as compared with the configuration in FIG. 5, it is possible to reduce the number of horizontal scanning circuits and also the area of the signal reading apparatus can be made smaller. To be more specific, by using a data transfer unit that constitutes the horizontal scanning circuit, it is possible to change the signal reading method in a logical computation unit represented by a logic circuit. Furthermore, the drive circuit unit 103 is provided with a switching mechanism in which a drive pulse or a frequency dividing pulse can be arbitrarily selected as a reference clock to be input to the data transfer unit.

Such a drive operation in the drive circuit unit 103 will be described. In FIG. 6, a control switch unit 603 is a switch to be turned ON when a high level is input to one of two input terminals. For the two signal lines for transmitting the signal from the logic circuit, a signal line for supplying the signal to a switch SW1, a switch SW3, and the like of the control switch unit 603 is set as a first control line 601 and a signal line for supplying the signal to a switch SW2, a switch SW4 and the like is set as a second control line 602.

In the case of the first signal reading method described according to the first embodiment, the drive signal is input to the two input terminals of the control switch unit 603. Herein, with the supply of the high level input, the switch is turned ON. First, the drive pulse is input and the reference clock is input to the data transfer unit. At this time, in response to the output of the terminal SR1-01 of the data transfer unit and the output from the logic circuit, switches M1 to M4 of the switch unit 109 are turned ON at the same time. Then, the outputs from the terminals SR1-02 and SR1-03 subsequently operate the switches of the switch unit 109.

On the other hand, the case of the second signal reading method will be described. The logic circuit is supplied with the drive pulse. From the logic circuit, in synchronism with the odd-numbered high level of the drive pulse, the high level is output to the first control line 601. Then, in synchronism with the even-numbered high level of the drive pulse, the high level is output to the second control line 602. As the reference clock, the frequency dividing pulse obtained by dividing the drive pulse by ½ is input. As a result, the reference clock is driven with the halved frequency of the drive pulse.

Then, the terminal SR1-01 outputs the high level two times longer than the case of the first signal reading method. During the period in which the terminal SR1-01 outputs the high level, the switch SW1 is turned ON in response to the pulse of the first control line 601 in the first half and the switch SW2 is turned ON in response to the pulse of the second control line 602 in the second half. In this manner, the second signal reading method is performed.

According to the present embodiment, the description has been given of the drive in the configuration according to the first embodiment, but the configuration is not limited to the above. While corresponding to the configuration of the common signal line or the like, the drive in the frequency dividing circuit or the number of control lines may be changed.

Fourth Embodiment

Figure 7:
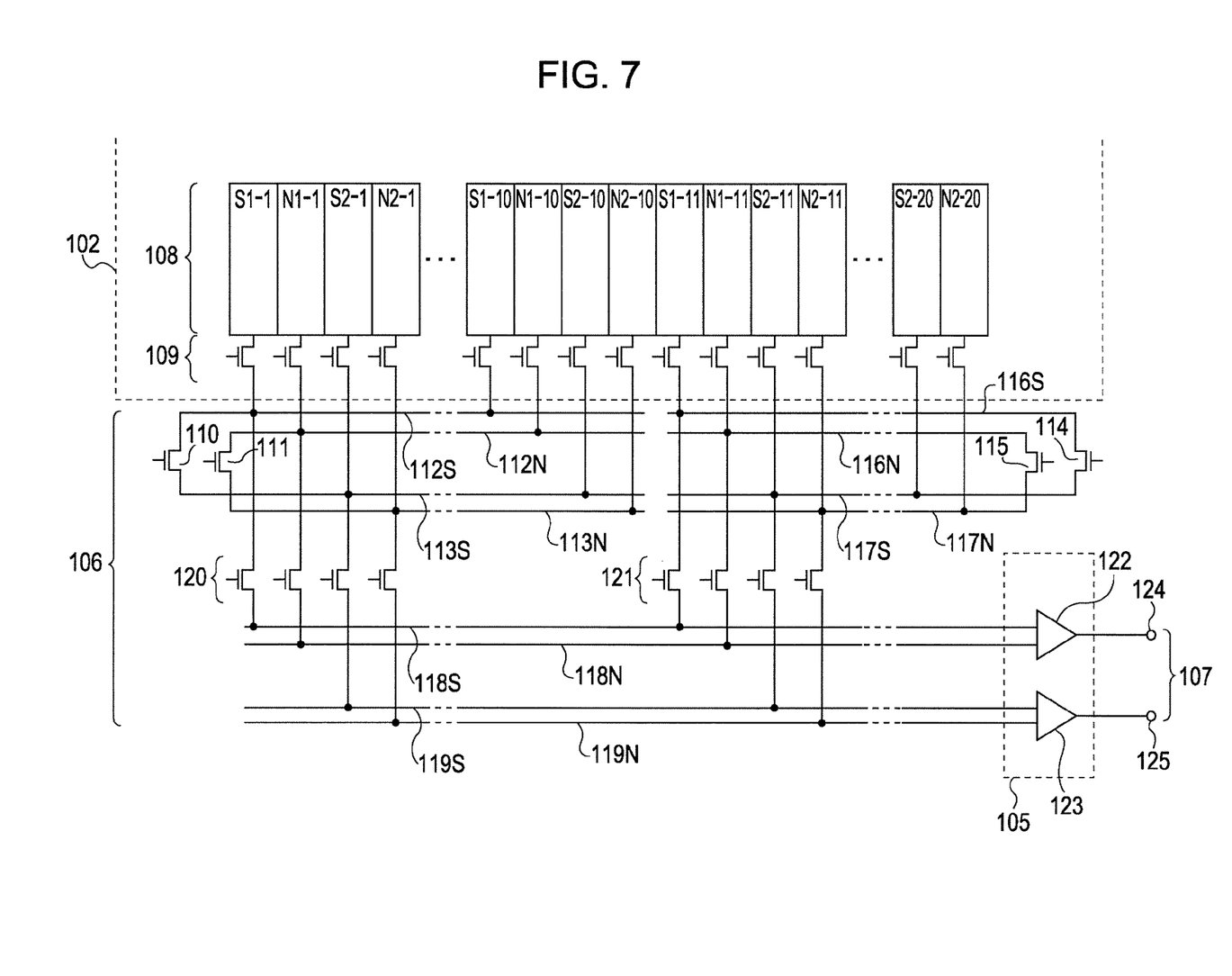
FIG. 7 is a part of a circuit diagram illustrating a signal reading apparatus according to the fourth embodiment.

According to the present embodiment, the configuration of the common signal line according to the first embodiment is changed. With reference to FIG. 7, the present embodiment will be described. FIG. 7 is a schematic circuit diagram of the signal reading apparatus. A description of components allocated with the reference numerals corresponding to those in FIG. 1 will be omitted. In FIG. 7, in the line memory 108, 40 line memories S1-1 to N2-10 are set as a first block and line memories S1-11 to N2-20 are set as a second block. In the first block, signals are read into the first common signal line 112S, the second common signal line 113S, the third common signal line 112N, and the fourth common signal line 113N. In the second block, similarly to the first block, the first common signal line to the fourth common signal line are arranged. To be more specific, the common signal lines are respectively denoted by reference numerals 116S, 116N, 117S, and 117N. These common signal lines are provided with the switches 110, 111, 114, and 115. These switches control a conductive state between the first common signal line and the third common signal line and a conductive state between the second common signal line and the fourth common signal line for each block, similarly to that of the first embodiment.

Then, the common signal lines are provided with the switching units 120 and 121 for each block. In each switch unit, four switches are provided. A first signal line 118S from which the signals from the plurality of first common signal lines are output and a second signal line 119S from which the signals from the plurality of second common signal lines are output are included. Furthermore, a third signal line 118N from which the signals from the plurality of third common signal lines are output and a fourth signal line 119N which the signals from the plurality of fourth common signal lines are output are also included. The signal lines 118S and 118N form a first signal line pair and the signal lines 119S and 119N form a second signal line pair.

Figure 3B:
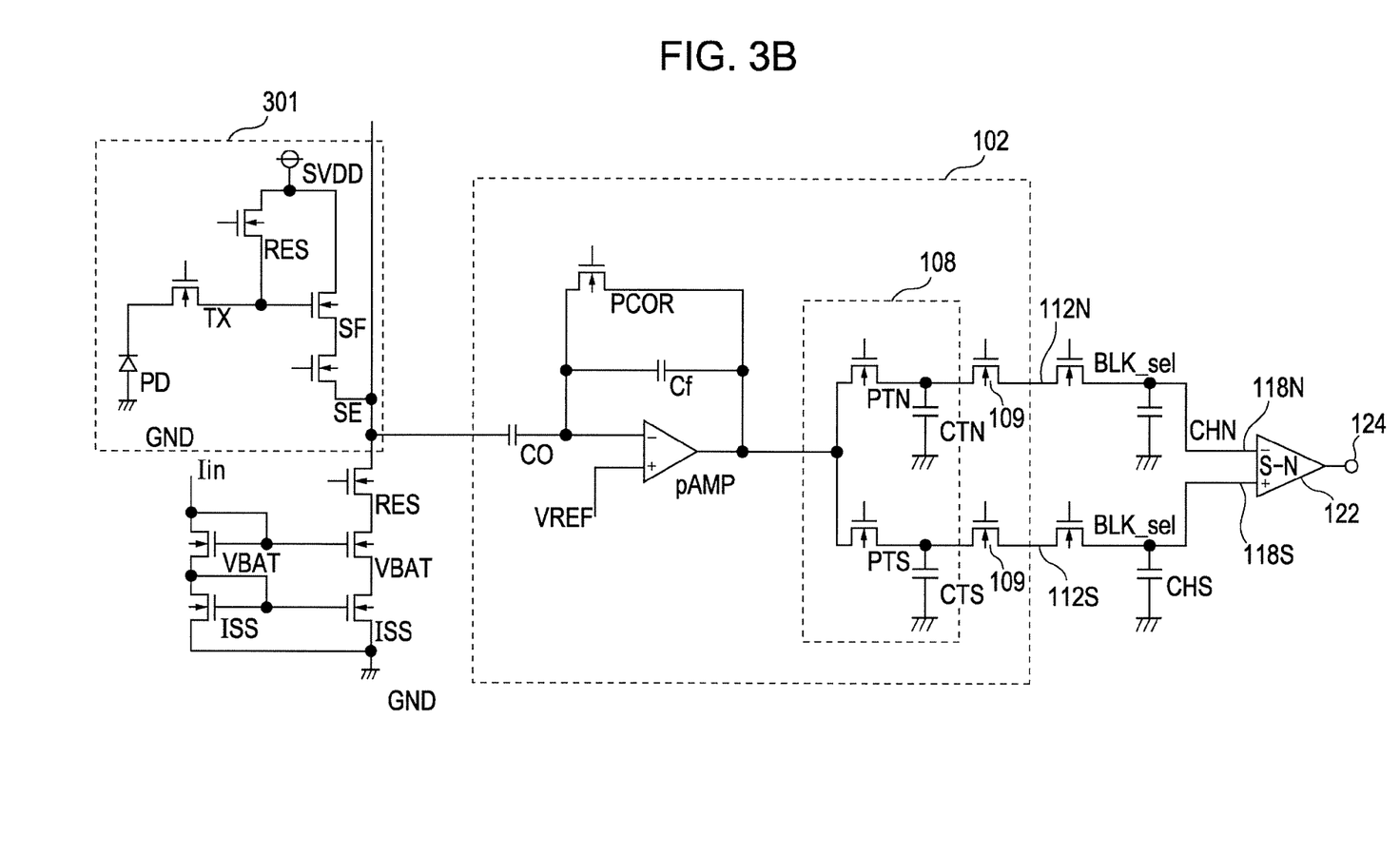
FIG. 3B illustrates an equivalent circuit of a reading unit according to a fourth embodiment of the present invention.

FIG. 3B is an equivalent circuit illustrating a part of the configuration of FIG. 7. A description of components allocated with the reference numerals corresponding to those in FIG. 3A will be omitted. Different parts from FIG. 3A in the configuration are signal lines 118S and 118N, and switches arranged between signal lines 112 and 118.

According to the first signal reading method in the configuration of FIG. 7, first, the switches 110, 111, 114, and 115 are turned OFF. Then, the switching unit 120 corresponding to the first block is turned ON, and the switch of other block, for example, the switching unit 121 is turned OFF. Then, the signals are output from the respective common signal lines 112S, 112N, 113S, and 113N of the first block via the switching unit 120 to the respective signal lines 118S, 118N, 119S, and 119N. Next, the switching unit 120 is turned OFF, and the switching unit 121 is turned ON. The signals from the respective common signal lines 116S, 116N, 117S, and 117N of the second block are output to the respective signal lines 118S, 118N, 119S, and 119N. Regarding the second signal reading method, the switches 110, 111, 114, and 115 are turned ON, and the signals are read in a similar manner to the first signal reading method.

With such a blocked configuration, it is possible to reduce the number of the respective common signal lines and the number of switches connected to the common signal lines. As a result, it is possible to suppress the capacitance CH of the respective signal lines. That is, CT/(CT+CH) of the gain of the signal that is read from the line memory 108 can be increased, and it is possible to set Gamp in the drive circuit unit 105 low. Thus, a high speed reading can be performed. In addition, it is possible to provide a high-speed low-noise amplifier circuit.

Herein, the gain of the signal read at this time is represented as follows. The capacitance for the common signal lines 112S, 113S, and the like is set as CHa, and the capacitance for the signal lines 118S, 119S, and the like is set as CHb. A case where the signals are read from the first and second signal lines in parallel is represented by Expression 4. Then, a case where the signals are read from one signal line while turning ON the switch 110 and the like is represented by Expression 5.

$$CT \cdot Gamp/(CT+CHa+CHb) \quad \text{(Expression 4)}$$

$$CT \cdot Gamp/(CT+2CHa+CHb) \quad \text{(Expression 5)}$$

When the capacitance CHa for the common signal line and the capacitance CHb for the signal line according to the present embodiment are compared with the capacitance CH for the common signal line according to the first embodiment, CH>>CHa+CHb is established. Also, by adjusting the unit of the block, CHa<<CHb is established, and therefore the increased amount of the capacitance in Expression 5 is not so large as compared with Expression 4. For example, the increased amount is less than 10%. This means that it is possible to suppress the capacitance as compared with the first embodiment where the capacitance becomes doubled.

Herein, the first block will be examined. The switches 110, 111, 114, and 115 for controlling the conductive state of the common signal line 112S, 112N, 113S, and 113N may be provided more than one each. At that time, the switches may be arranged at arbitrary positions with respect to the common signal lines. Also, for example, in a case where the switch 110 is turned ON, the signal of the line memory S2-1 is read into the first common signal line 112S via the switch 110. Herein, in order to suppress the offset in the signals of the line memories S1-1 and S2-1, it is desired that a resistance value of the switch 110 is smaller than that of the switch in the switching unit 120.

Moreover, such a configuration can be adopted that a switch for connecting the first signal line 118S to the second signal line 119S and the like are further added to the present embodiment. In that case, a configuration without the switches 110 and 111 and the like may be employed.

According to the present embodiment, the capacitance for the common signal line can be reduced, and therefore it is possible to increase the signal reading speed. In addition, there is no need to increase the gain of the drive circuit unit, and therefore it is possible to suppress the possibility that noise will occur.

Fifth Embodiment

A description will be given of a case where an image pickup system is adapted as the signal reading apparatus according to the present invention. The signal reading apparatus according to the present embodiment is a photoelectric conversion apparatus which includes a photoelectric conversion element for detecting a light. A case where a digital still camera is used as an example of the image pickup system will be described with reference to FIG. 8. Other examples of the image pickup system include a digital camcorder and the like.

Figure 8:
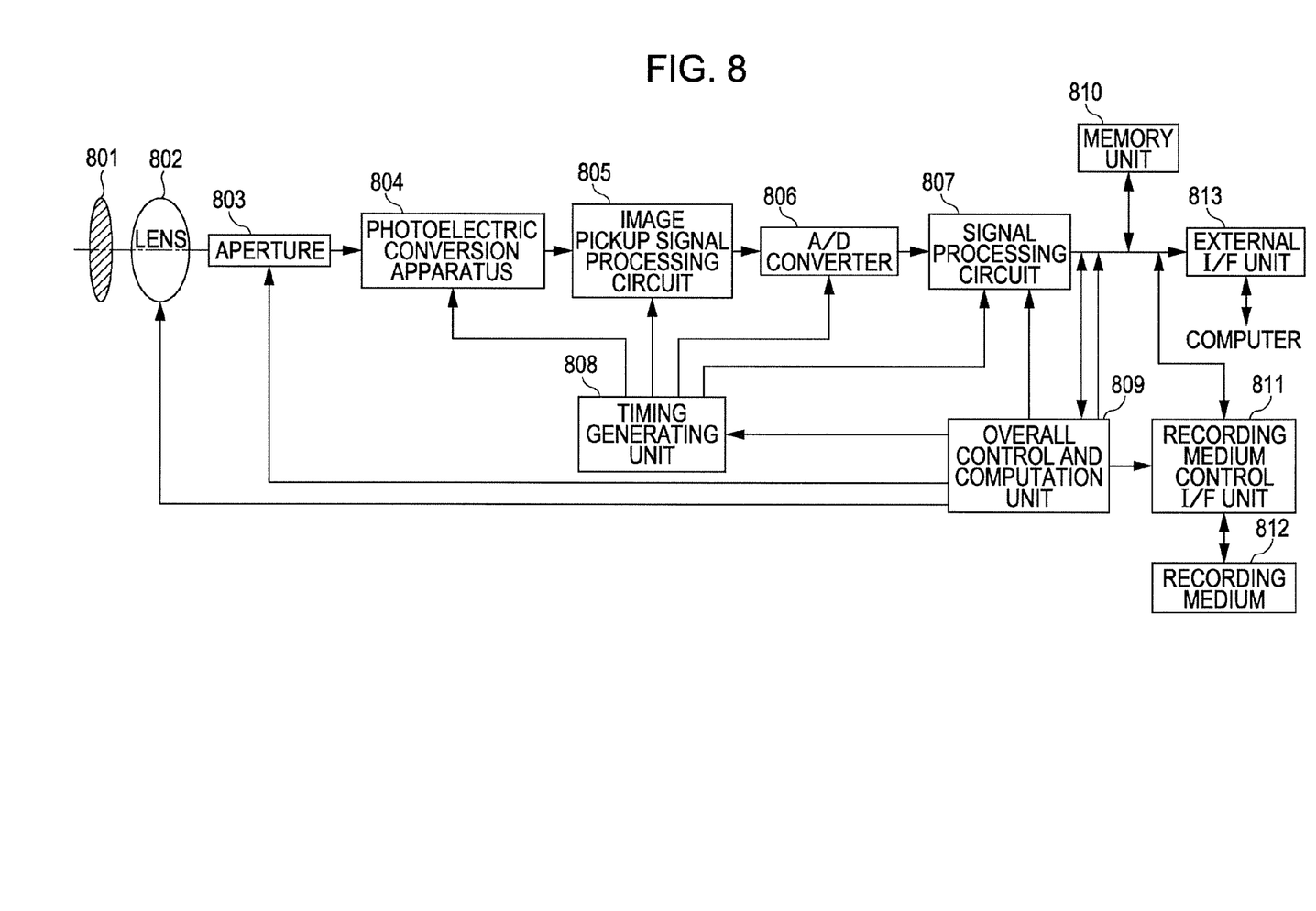
FIG. 8 is a block diagram for describing an image pickup system.

FIG. 8 is a block diagram for describing a system of the digital still camera.

An optical image of an object is formed on an image pickup surface of a photoelectric conversion apparatus 804 by an optical system including a lens 802 and the like. On the outside of the lens 802, a barrier 801 doubling as a protecting function for the lens 802 and a main switch may be provided. For the lens 802, an aperture 803 for adjusting the illumination of light output from the lens may be provided. Image pickup signals output from the photoelectric conversion apparatus 804 in a plurality of channels are subjected to various corrections, clamping, and the like performed by an image pickup signal processing circuit 805. The image pickup signals output from the image pickup signal processing circuit 805 in a plurality of channels are subjected to analog-digital conversion in an A/D converter 806. The image data output from the A/D converter 806 is subjected to various corrections, data compression, and the like performed by the signal processing unit (image processing unit) 807. The photoelectric conversion apparatus 804, the image pickup signal processing circuit 805, the A/D converter 806, and the signal processing unit 807 are operated in accordance with timing signals generated by a timing generation unit 808.

Blocks 805 to 808 may be formed on the same chip where the photoelectric conversion apparatus 804 is arranged. Also, the respective blocks are controlled by an overall control and computation unit 809. In addition, a memory unit 810 configured to temporarily store image data and a recording medium control interface unit 811 configured to record or read an image in or from a recording medium are further provided. A recording medium 812 is composed of a semiconductor memory and the like and can be mounted or removed. Furthermore, an external interface (I/F) unit 813 configured to communicate with an external computer or the like may also be provided.

Next, operations in FIG. 8 will be described. In accordance with opening of the barrier 801, a main power supply, a power supply for a control system, and a power supply for an image pickup system such as the A/D converter 806 are sequentially turned ON. After that, the overall control and computation unit 809 opens the aperture 803 to control the light exposure. The signal output from the photoelectric conversion apparatus 804 passes through the image pickup signal processing circuit 805 to be output to the A/D converter 806. The A/D converter 806 performs the A/D conversion on the signal to be output to the signal processing unit 807. The signal processing unit 807 processes the data to be provided to the overall control and computation unit 809. The overall control and computation unit 809 performs a computation to determine the light exposure. The overall control and computation unit 809 controls the aperture on the basis of the determined light exposure.

Next, the overall control and computation unit 809 takes out a high frequency component from the signal, which has been output from the photoelectric conversion apparatus 804 and processed in the signal processing unit 807, and computes a distance to the object on the basis of the high frequency component. After that, the lens 802 is driven to determine whether a focused state is obtained or not. When it is determined that the focused state is not obtained, the lens 802 is driven again to compute the distance.

After the focused state is confirmed, main exposure is started. When the exposure is ended, the image pickup signal output from the photoelectric conversion apparatus 804 is subjected to corrections and the like in the image pickup signal processing circuit 805 and A/D conversion in the A/D converter 806, and is processed in the signal processing unit 807. The image data processed in the signal processing unit 807 is accumulated in the memory unit 810 by the overall control and computation unit 809.

Thereafter, the image data accumulated in the memory unit 810 is recorded in the recording medium 812 via the recording medium control I/F unit in accordance with the control by the overall control and computation unit 809. Also, the image data may be input to and processed in a computer via the external I/F unit 813.

In a case where image pickup of a still image is performed by such a digital still camera, a drive is performed for reading the signals in parallel from the four output terminals of the signal reading apparatus illustrated in FIG. 2. Then, in a case movie image pickup is performed by the digital still camera, for example, thinned-out drive and multiplexing drive are performed, and a drive is performed for reading the signals in parallel from the two output terminals of the signal reading apparatus. In addition to the above-described drives, there is a drive for cutting a part of a screen and reading the part irrespective of the still image or movie. During such a drive, by adapting the signal reading method with which the number of output terminals is reduced, it is possible to suppress the consumption current to approximately 60% as compared with the case of performing image pickup of the still image. By reducing the number of output terminals, it is possible to reduce the number of reading amplifiers to be operated as the consumption current can be suppressed. In addition, it is also possible to stop the A/D converter to which the signal is input from the output terminal at the same time. Thus, the image pickup system can attain further lower power consumption.

Therefore, as the number of output terminals can be switched through the simple method, it is possible to provide the image pickup system in which the high speed drive and the lower power consumption drive can be easily switched.

It is noted that the photoelectric conversion apparatus has been described in the above-mentioned embodiments, but the present invention relates to the configuration of the common signal line and thus the signal to be detected may be a magnetic signal. In the configuration as well, the common signal line may not necessarily be the pair for the optical signal and the reset signal.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-242932 filed Sep. 7, 2006, which is hereby incorporated by reference herein in its entirety.

What is claimed is:

1. A signal reading apparatus, comprising:
a signal generating unit that generates a plurality of signals;
a plurality of readout lines that receives the plurality of signals from the signal generating unit;
a plurality of common signal lines to which the signal generating unit provides an output, the plurality of common signal lines at least including a first common signal line, a second common signal line, a third common signal line, and a fourth common signal line;
a plurality of first switches that control an electrical connection between the plurality of readout lines and the plurality of common signal lines;
a plurality of signal lines at least including a first signal line and a second signal line;
a plurality of second switches that control an electrical connection between the first common signal line and the first signal line, between the second common signal line and the second signal line, between the third common signal line and the first signal line, and between the fourth common signal line and the second signal line;
a drive circuit unit including a scanning circuit that controls the plurality of second switches;
an amplifier circuit unit at least including a first amplifier circuit amplifying a signal from the plurality of signal lines and a second amplifier circuit amplifying a signal from the second signal line;
a plurality of third switches that control an electrical connection between the first common signal line and the second common signal line, and between the third common signal line and the fourth common signal line; and
a control unit that controls switching between a first signal reading operation and a second signal reading operation,
wherein, in the first signal reading operation, the third switches are turned OFF by the control unit to read signals from the first amplifier circuit and the second amplifier circuit, and
wherein, in the second signal reading operation, the third switches are turned ON by the control unit to read signals of the first common signal line, the second common signal line, the third common signal line, and the fourth common signal line individually from the first amplifier circuit.

2. The signal reading apparatus according to claim 1, wherein the switching between the first signal reading operation to the second signal reading operation sets a non-conductive state between the second amplifier circuit and a power supply.

3. The signal reading apparatus according to claim 2, wherein the control unit controls a conductive state of a switch and controls a conductive state between the second amplifier circuit and the power supply.

4. The signal reading apparatus according to claim 1, wherein a signal from the first common signal line and a signal from the second common signal line are alternately input to the first amplifier circuit in the second signal reading operation.

5. The signal reading apparatus according to claim 1, wherein the signal generating unit includes a photoelectric conversion element.

6. The signal reading apparatus according to claim 1,
wherein the signal reading apparatus is incorporated in an image pickup system,
wherein the signal generating unit includes a photoelectric conversion element; and
wherein the image pickup system includes a signal processing unit configured to process an image pickup signal output from the signal reading apparatus.

7. The signal reading apparatus according to claim 1, wherein the drive circuit unit includes a built-in frequency division circuit.

8. The signal reading apparatus according to claim 1, wherein the drive circuit unit includes at least two scanning circuits.

9. A signal reading apparatus, comprising:
a signal generating unit that generates signals;
a capacitor that stores the signals from the signal generating unit;
a plurality of common signal lines at least including a first common signal line, a second common signal line, a third common signal line, and a fourth common signal line to which the signals from the signal generating unit are output;
a plurality of first switches that control an electrical connection between the capacitor and the plurality of common signal lines;
a plurality of signal lines at least including a first signal line and a second signal line;
a plurality of second switches that control an electrical connection between the first common signal line and the first signal line, between the second common signal line and the second signal line, between the third common signal line and the first signal line, and between the fourth common signal line and the second signal line;
an amplifier circuit unit at least including a first amplifier circuit amplifying a signal from the plurality of signal lines and a second amplifier circuit amplifying a signal from the second signal line;
a plurality of third switches that control an electrical connection between the first common signal line and the second common signal line, and between the third common signal line and the fourth common signal line; and
a control unit that controls switching between a first signal reading operation and a second signal reading operation,
wherein, in the first signal reading operation, the third switches are turned OFF by the control unit to read signals from the first amplifier circuit and the second amplifier circuit, and
wherein, in the second signal reading operation, the third switches are turned ON by the control unit to read signals from the first common signal line, the second common signal line, the third common signal line and the fourth common signal line individually from the first amplifier circuit.

10. The signal reading apparatus according to claim 9, wherein the switching from the first signal reading operation to the second signal reading operation sets a non-conductive state between the second amplifier circuit and a power supply.

11. The signal reading apparatus according to claim 10, wherein the control unit controls a conductive state of a switch and controls a conductive state between the second amplifier circuit and the power supply.

12. The signal reading apparatus according to claim 9, wherein a signal from the first common signal line and a signal from the second common signal line are alternately input to the first amplifier circuit in the second signal reading operation.

13. The signal reading apparatus according to claim 9, wherein the signal generating unit includes a photoelectric conversion element.

14. The signal reading apparatus according to claim 9,
wherein the signal reading apparatus is incorporated in an image pickup system,
wherein the signal generating unit includes a photoelectric conversion element, and
wherein the image pickup system includes a signal processing unit configured to process an image pickup signal output from the signal reading apparatus.

15. The signal reading apparatus according to claim 9, further comprising a driver circuit unit including a built-in frequency division circuit and a scanning circuit for controlling the plurality of first switches.

16. A signal reading apparatus according to claim 15, wherein the drive circuit unit includes at least two scanning circuits.

17. The signal reading apparatus according to claim 9, wherein
the plurality of common signal lines include a fifth common signal line, a sixth common signal line, a seventh common signal line, and a eighth common signal line to which the signals from the signal generating unit are output,
the plurality of signal lines include a third signal line and a fourth signal line,
the plurality of second switches control an electrical connection between the fifth common signal line and the third signal line, between the sixth common signal line and the fourth signal line, between the seventh common signal line and the third signal line, and between the eighth common signal line and the fourth signal line;
the plurality of third switches control an electrical connection between the fifth common signal line and the sixth common signal line, and between the seventh common signal line and the eighth common signal line,
wherein the third signal line is connected to the first amplifier circuit, and
wherein the fourth signal line is connected to the second amplifier circuit.

18. The signal reading apparatus according to claim 17, wherein signals of the first, second, third and fourth common signal lines are optical signals, and signals of the fifth, sixth, seventh and eighth common signal lines are reference signals.

19. The signal reading apparatus according to claim 18, wherein the first amplifier circuit and the second amplifier circuit are differential amplifiers and perform a differential process between the optical signals and the reference signals.

20. A signal reading apparatus, comprising:
a signal generating unit that generates signals;
a plurality of signal lines that receives the signals from the signal generating unit;
a plurality of common signal lines at least including a first common signal line and a second common signal line to which signals from the signal generating unit are output;
a plurality of switches that control an electrical connection between the plurality of signal lines and the plurality of common signal lines;
a drive circuit unit including a scanning circuit that controls the plurality of switches;
an amplifier circuit unit at least including a first amplifier circuit amplifying a signal from the first common signal line and a second amplifier circuit amplifying a signal from the plurality of common signal lines;
a switch configured to control an electrical connection of the first common signal line and the second common signal line; and
a control unit that controls switching between a first reading operation and a second reading operation,
wherein, in the first reading operation, the switch is turned OFF by the control unit to read signals from the first amplifier circuit and the second amplifier circuit, and
wherein, in the second reading operation, the switch is turned ON by the control unit to read signals of the first common signal line and the second common signal line individually from the first amplifier circuit, and the control unit stops driving of the second amplifier circuit.

* * * * *